United States Patent [19]

Cocjin et al.

[11] 4,033,876
[45] July 5, 1977

[54] SPILLED OIL RETRIEVER AND ANTI-WATER POLLUTION WATER CRAFT

[75] Inventors: Diosdado L. Cocjin, Quezon City; Artemio M. Masongsong, Manila, both of Philippines

[73] Assignee: Diosdado L. Cocjin, Quezon City, Philippines

[22] Filed: Feb. 6, 1976

[21] Appl. No.: 655,937

[52] U.S. Cl. .................... 210/242 S; 210/DIG. 25
[51] Int. Cl.² ........................................ E02B 15/04
[58] Field of Search ............. 210/83, 242, DIG. 25

[56] References Cited
UNITED STATES PATENTS

| | | | |
|---|---|---|---|
| 61,880 | 2/1967 | Serrell | 210/DIG. 25 |
| 3,656,619 | 4/1972 | Ryan et al. | 210/242 |
| 3,700,109 | 10/1972 | Lasko | 210/242 |
| 3,708,070 | 1/1973 | Bell | 210/DIG. 25 |
| 3,737,040 | 6/1973 | Brydey | 210/242 |
| 3,752,317 | 8/1973 | Lithen | 210/DIG. 25 |
| 3,860,519 | 1/1975 | Weatherford | 210/DIG. 25 |
| 3,957,646 | 5/1976 | Wickert | 210/242 |

*Primary Examiner*—Theodore A. Granger
*Attorney, Agent, or Firm*—Sughrue, Rothwell, Mion, Zinn & Macpeak

[57] ABSTRACT

A water craft having a pointed bow incorporates curved vertically pivotable gates to partially form the pointed bow along with an underwater scoop having a horizontal surface beneath the water with the gates opening to permit water and oil to move onto that surface and upward over an inclined surface leading to a horizontal trough amidships above the water craft line which trough opens for gravity deposit of the oil and water into a water and oil separating tank within the rear of the water craft hull.

3 Claims, 9 Drawing Figures

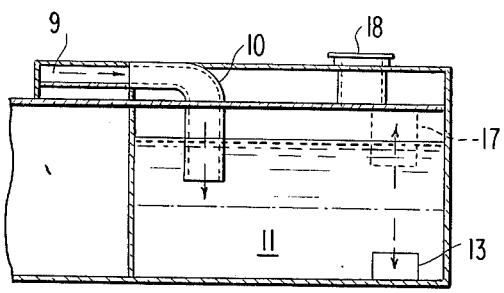
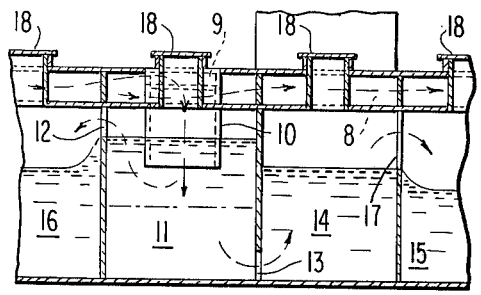
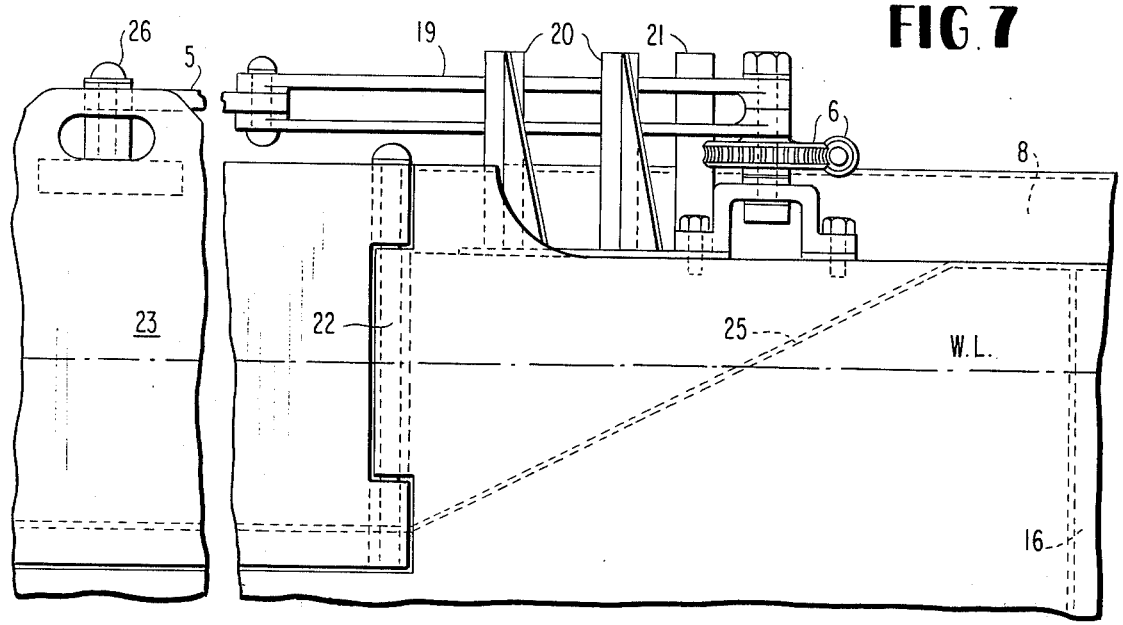
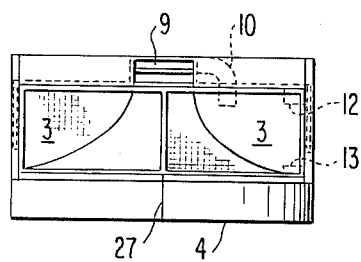
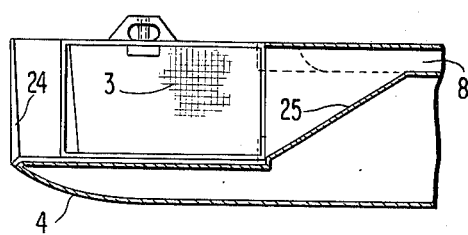

SPILLED OIL RETRIEVER AND ANTI-WATER POLLUTION WATER CRAFT

This invention pertains to a unique type of water craft. Principally, this invention discloses a watercraft which is capable of gathering spilled oil or liquids lighter than water which pose as a health hazard to people and marine life.

Due to tanker mishap or failure of offshore oil wells, crude oil is spilled on the water surface. In some cases, this spilled oil is of enormous quantity covering a substantial surface of water. Due to the action of tide and water currents, this spilled oil is eventually driven to the shore, killing marine life and birds aside from polluting beaches which are being utilized for swimming and recreation. Because of the devastation brought about by spilled oil, studies have been made pertaining to means and ways of ridding the water surface of this unwanted oil before they cause some damage. Many schemes were tried but none proved to be satisfactory. It is with this problem in mind that the inventor thought of this water craft to rid the water surface of oil and at the same time retrieve the oil in a state which can be delivered to the refinery and can still be processed into useful products.

It is, therefore, the primary object of this invention to provide a means of ridding the water surface of unwanted oil.

It is another object of this invention to provide a water craft which can retrieve spilled oil on the water surface in a state which can still be processed by refineries into useful products.

Still, it is another object of this invention to provide a water craft that can be used for used for storing and transporting liquid fuel or chemicals when it is not used as an oil retriever.

Other objects will become apparent after the reader will have persued the following discription of the construction and operation of this particular type of water craft.

FIG. 1 shows the top view of the waterr craft illustrating the appearance of craft while it is used for its normal duty of storing and transporting liquid fuels and chemicals. The same figure also show how the gates, dotted lines, located on the forward section of the craft open to form the arms which gather the oil from the surface of the water and funnel it to a covered trough amid ship the craft.

FIG. 5 shows the fragmentary sectional view as seen through Section C—C.

FIG. 6 is a fractional sectional view as seen through Section D—D.

FIG. 7 is a fragmentary sectional view of the ship's bow showing the detailed of the mechanics for opening and closing the gates.

FIG. 8 illustrates the positioning of the strainer before the trough as seen through Section B—B.

FIG. 9 is a fragmentary sectional view of the bow showing the strainer as seen from one of the sides.

Figure 1:
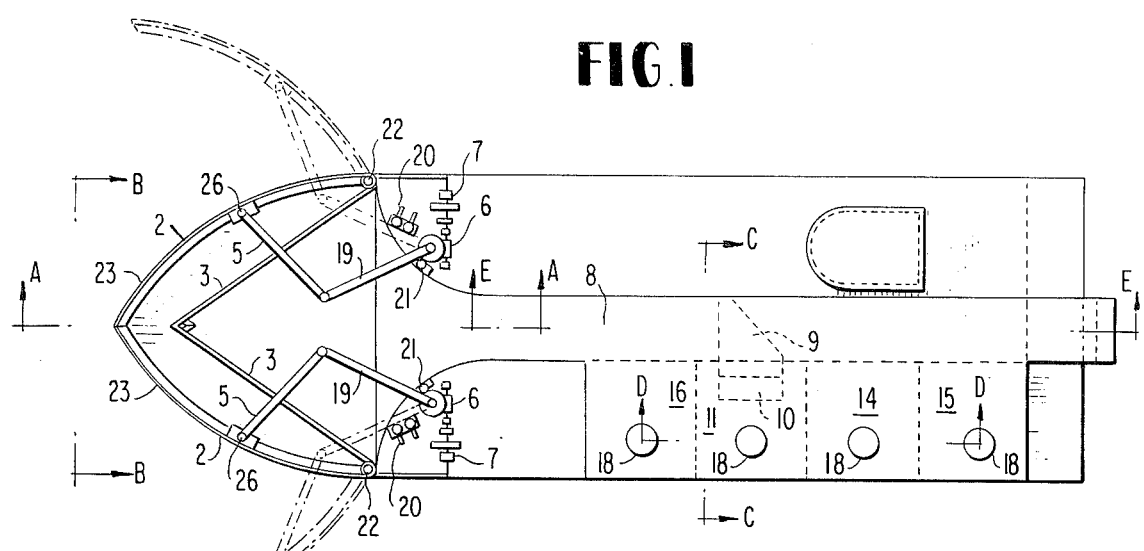
Figure 2:
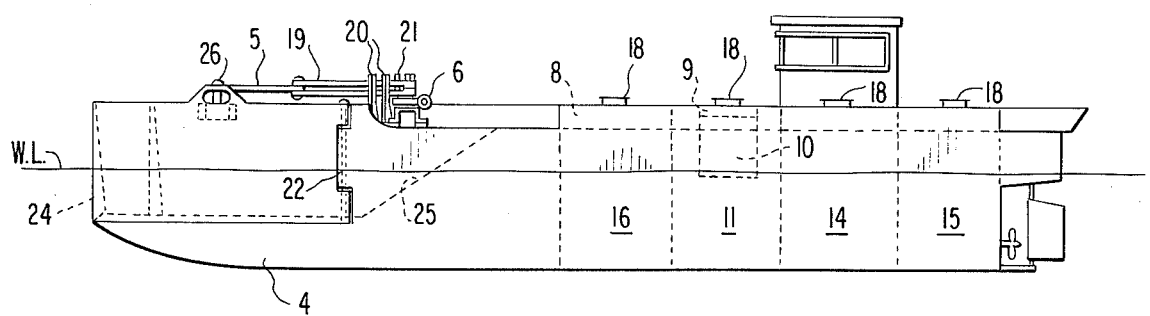
FIG. 2 shows the side view of the water craft as well as the silhouette of the super structure. It should be noted that the craft rides low on the water surface to enable it to pick up the oil on the water surface and deliver it to the trough.

This multi-purpose watercraft is constructed in a rather novel way as shown in FIGS. 1 and 2. At the fore section, or bow a provision is made for scooping up and gathering the oil on the water surface. Provisions consist of an openable gates 2 and scoop 4 which define when the gates are closed, a modified V-shaped bow. The gates 2 are closed or opened by a lever means system 5 operated by a worm and gear which, in turn, is being moved by electric motor. The solid lines of the bow in FIGS. 1 and 2 show the gates 2 in a closed condition. The gates 2 are hinged to structures 22 located on both sides of the craft. When in closed condition, the gates 2 are partly supported by the upper portion of scoop 4. The ends 23 are held close to each other and bear on the vertical post 24. The gates 2 are also constructed with double walls to form air spaces therein which if surrounded by water will cause a bouyant force. Such bouyant force must be of a magnitude to enable the gates to float on water in the opened condition, thereby relieving the hinges of a considerable load. Located on the upper portion of the gate 2 is a pin-like member 26 which attaches the lever means system to the gate 2. Lever 19 further links the gates 2 to worm and gear arrangement 6. Electric motors 7 are operated to close or open the gates 2.

The scoop 4 is actually the lower portion of the bow. It is provided with a slanting side 25 which raises the water vertically into the trough 8 when the craft moves forward with sufficient speed. Installed also on the upper surface of scoop 4 is a V-shaped strainer 3 which prevents debris floating on the water surface from fouling up the entrance of the trough 8.

As shown in FIG. 1, a trough 8, located centrally and extending through the length of the craft, is mounted in the main deck. Approximately, situated aft of the mid section of the trough 8 is baffle 9. This member is placed astride of trough 8 with its bottom edge extending some distance below the surface of the water flowing in the trough 8. Baffle 9 completely blocks the flow of oil on the water surface and detours it to a downspout 10 which delivers the oil with some water to the separating tank 11. See FIGS. 3, 4, 5 and 6 for details. The rest of the flowing sans the oil flows below baffle 9 and the remaining aft section of the trough to be discharged at the stern. See FIG. 3.

The downspout 10 delivers the mixture of oil and water to middle tank 11 which in this particular case is located in the portside of the craft. The tank 11 is provided with an oil overflow outlet 12 and a submerged water outlet 13. The oil that flows out of tank 11 is deposited on tank 16 from which the oil is later pumped to the different storage tanks of the watercraft. The water that passes out of the submerged outlet 13 into tank 14 is made to overflow out of outlet 17 into tank 15. From tank 15, water is pumped out of the craft.

Oil and water are separated in tank 11 by the principle of the immiscibility of water and oil and the difference in specific gravities. The oil being lighter than water floats on the surface of the water. Inasmuch as tank 11 is initially filled up with approximately one half water and the other upper half oil, an equilibrium is achieved in which the surface of the oil in tank 11 is much higher than that of the water in tank 14. The oil overflow outlet 12 is then situated at this surface level of the oil and the water overflow outlet 12 is likewise located at the surface level of the water tank 14 which is, of course, lower than that for the oil. Manholes 18 may be provided on each tanks for easy access to the tanks for purposes of cleaning or repair.

To utilize this watercraft for oil retrieval, the vessel is first trimmed. The prow of the scoop 4 is intentionally positioned to be approximately a foot below the water surface. The two gates are then opened by starting the electric motors 7. Said gates 2 are fully opened as soon as the link 19 bears on support 20. Meanwhile, separator tanks 11 and 14 are filled up with approximately one half water and the other top half oil as shown in FIG. 6. The demarcation line between the two liquids is indicated by the dotted line in FIG. 6. With the craft ready for operation, the propulsion engines are started and the craft is moved forward.

Figure 3:
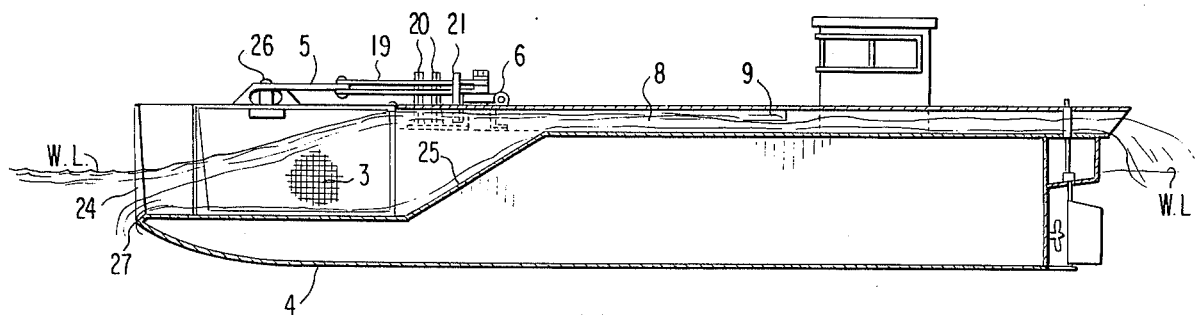
FIG. 3 is the sectional longitudinal view of the craft showing how the oil is scooped up, funnelled to the trough and later detoured to the separator tank while the excess water is discharged at the stern of the craft.
Figure 4:
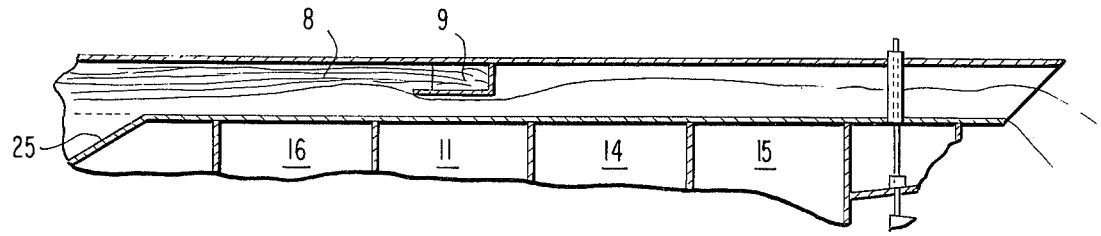
FIG. 4 is a fragmentary sectional view of the trough as seen through section E—E.

Due to the forward motion of the watercraft, water and oil floating on its surface is scooped up by prow 27. At the same time, the gates 2, acting as arms gather horizontally the oil on the water surface. With the craft gaining more speed, the water scooped up would be raised to a level of the trough and thus flows through it by the action of gravity as shown in FIG. 3. Upon reaching baffle 9, the upper portion of the water with oil on its surface is blocked and directed to downspout 10 which deposite the mixture into the separator tank 11.

In the separator tank 11, the oil and water separates. The water submerging and the oil floating on top of the water. Further addition of oil in tank 11 will cause the oil to spill out of overflow outlet 12. And addition of water in tank 11 will cause the water in tank 14 to spill out of the overflow outlet 11. From the tank 16 oil may be pumped to various storage tanks of the craft. Likewise from tank 15, water may be pumped out of the craft. The water in the lower part of the trough which is not blocked by baffle 9 flows through the remaining portion of the trough and is discharged at the stern as shown in FIG. 3.

To close the gates 2, the electric motors are operated in the reverse direction. The gates 2 can be considered closed as soon as the ends 23 bears on vertical post 24 and link 19 rests on vertical support 21.

The herewith drawings and description is only illustrative of the subject invention. Various modifications may be made by those skilled in the art without really departing from the essence of the invention. For example, the separating tanks may be substituted by a centrifugal separators which are presently known and sold in the market.

We claim:

1. A water craft capable of retrieving oil or chemicals lighter than and floating on the water surface, said craft comprising, in combination:

flat sidewalls terminating at their forward ends in a pointed bow;

said bow being recessed at its forward and upper portion to define a scoop lying beneath the water craft line, said scoop including a horizontal upper wall;

a pair of hollow gates, each of said gates conforming to the bow scoop and consistuting sidewall extensions of said water craft at said bow and having vertical forward and rear edges, the rear edges being hinged to the sides of said water craft hull for rotation about vertical axes and movable between closed and open positions wherein the forward vertical edges are closed to form the water craft pointed bow and are open so as to extend outwardly to the plane of the hull sidewalls to cause oil and water to converge onto the horizontal surface of the scoop;

means mounted on the hull and operatively coupled to the gates for opening and closing said gates;

a trough located amidship of the water craft and extending through its entire length including a forward, oblique portion which is in communication with the horizontal surface of said scoop and which extends upwardly and terminates above the water line such that a portion of said trough lies above the water line at the rear of said gates;

an oil and water separating tank within said hull;

an opening formed within the side of said trough above the water craft water line and open to said oil and water separating tank;

an oil storage tank within said hull and adjacent said oil and water separating tank, said oil and water separating tank being provided with an oil overflow outlet at an upper portion leading to said oil storage tank; and a submerged water outlet at a lower portion of said oil and water separating tank and beneath the water line of said water craft and being open to the water exterior of said water craft for permitting separated water flow out of said water craft; and baffle means installed on the water craft and astride said trough to block water and oil flow and detour that flow through said opening within the side of said trough into said oil and water separating tank.

2. A water craft as claimed in claim 1, further including a strainer mounted on said scoop upstream of said trough.

3. A watercraft as in claimed 2 wherein the means for opening the gates consists of levers, worm and gear, and an electric motor providing motive power.

* * * * *

UNITED STATES PATENT AND TRADEMARK OFFICE
CERTIFICATE OF CORRECTION

PATENT NO. : 4,033,876

DATED : July 5, 1977

INVENTOR(S) : Diosadado L. COCJIN et al

It is certified that error appears in the above-identified patent and that said Letters Patent are hereby corrected as shown below:

IN THE HEADING:

Assignee: Delete Name of Assignee (there is no assignee in this case)

Signed and Sealed this

Eighth Day of November 1977

[SEAL]

Attest:

RUTH C. MASON
Attesting Officer

LUTRELLE F. PARKER
Acting Commissioner of Patents and Trademarks